UNITED STATES PATENT OFFICE.

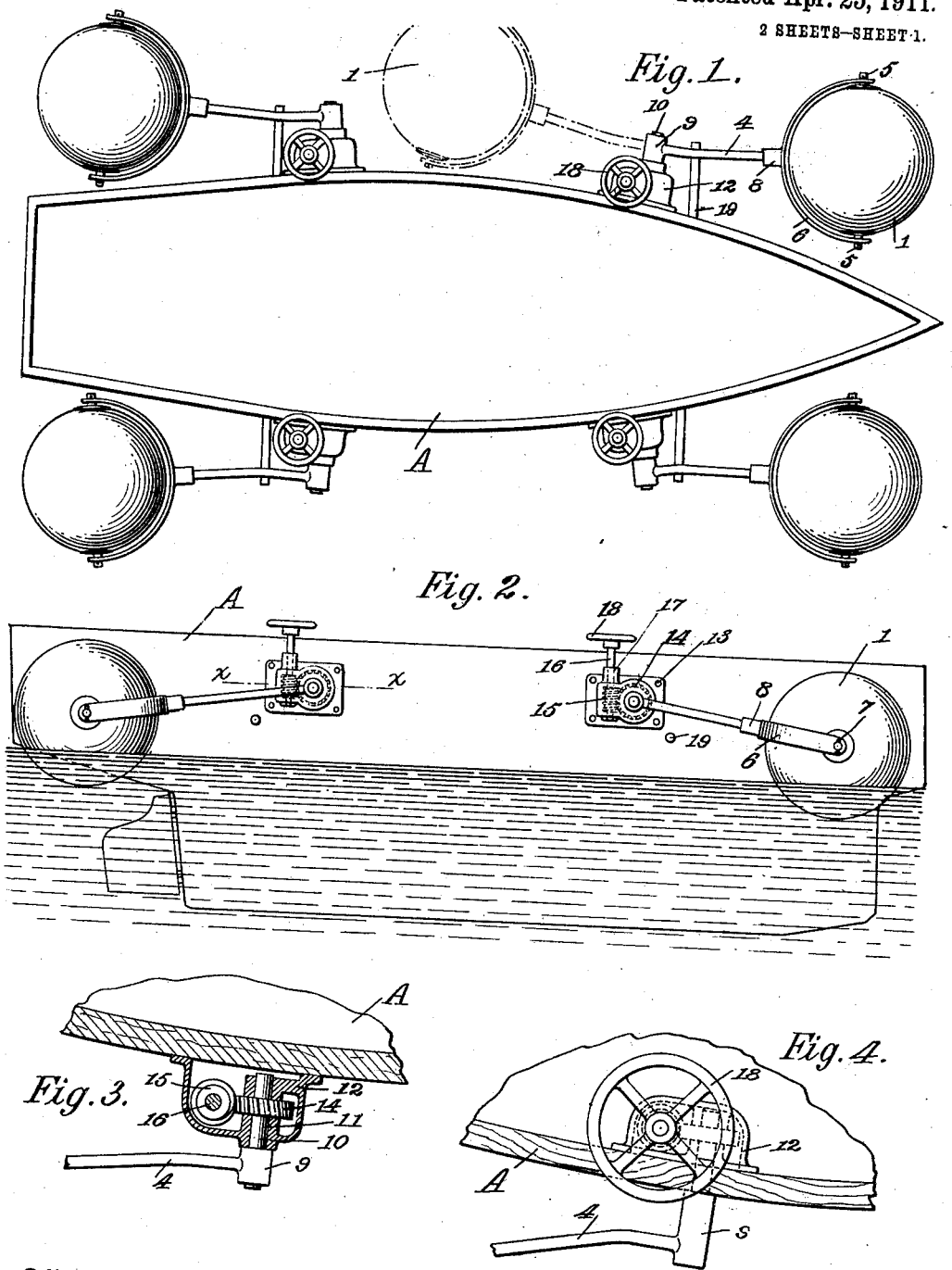

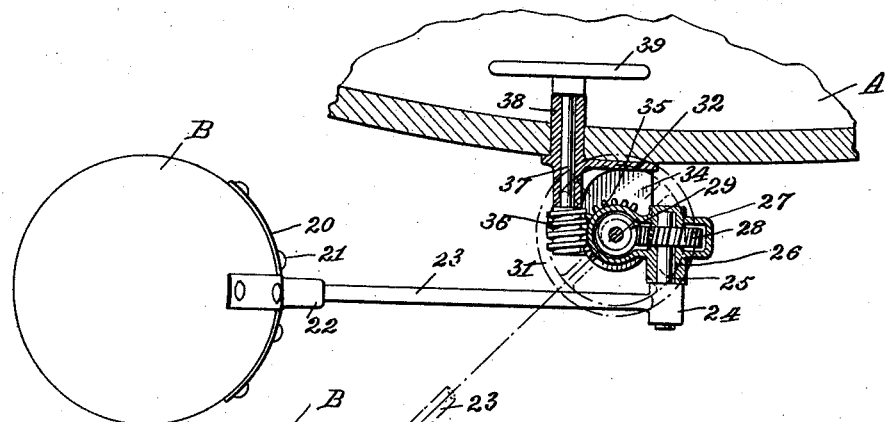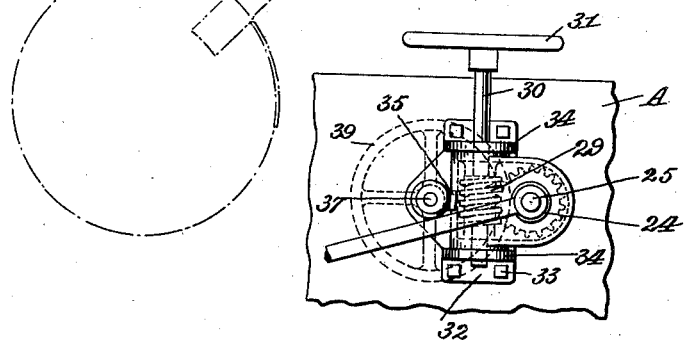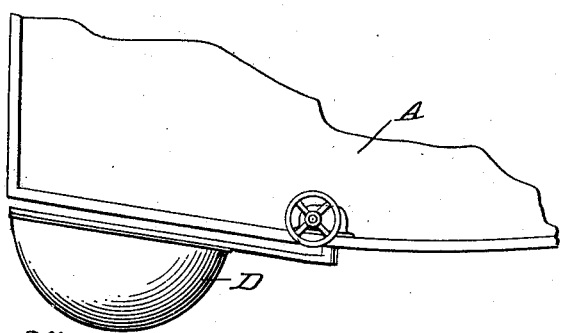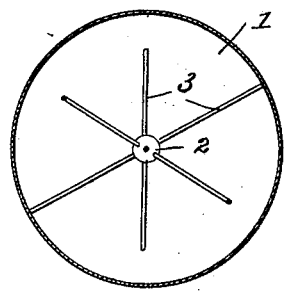

PAOLO MAGGIO, OF NEW YORK, N. Y., ASSIGNOR OF ONE-HALF TO GASPER J. LIOTA, OF BROOKLYN, NEW YORK.

VESSEL AND OTHER CRAFT.

990,759.    Specification of Letters Patent.    Patented Apr. 25, 1911.

Application filed July 11, 1910. Serial No. 571,438.

*To all whom it may concern:*

Be it known that I, PAOLO MAGGIO, a citizen of the United States, and a resident of the city of New York, county of Kings, and State of New York, have invented certain new and useful Improvements in Vessels and other Craft, of which the following is a full, clear, and exact specification.

My invention comprises means that may be operated to assist a vessel to keep afloat in times of emergency.

It may also be utilized to raise a part of a vessel above the water level that has sprung a leak, or has otherwise been injured.

My invention comprises a series of floats extending from the sides of the vessel, and are capable of being manned from the vessel to move them about in the water at pleasure. They are rigidly connected to the vessel, in the sense that their buoyancy property is directly transmitted to the vessel.

Referring to the drawings forming part of this specification—Figure 1 is a plan view representing a vessel equipped with four of my floats. Fig. 2 is a side elevation of Fig. 1. Fig. 3 is a fragmental sectional view through the plane *x—x* of Fig. 2. Fig. 4 is a fragmental plan view showing the mechanism devised on the inside instead of the outside of the vessel. Fig. 5 is a horizontal sectional view of a modification. Fig. 6 is an elevation of the modification shown in Fig. 5. Fig. 7 is a sectional view of a float showing the interior construction, and Fig. 8 is a modified form of float.

My invention consists broadly of the utilization of floats to give additional buoyancy to a vessel when occasion requires. The amount of additional buoyancy added will of course depend upon the number and size of floats. In the illustration shown in Fig. 1, four floats are shown and no particular heed is taken of the relative size of floats and vessel.

In the drawings Figs. 1, 2 and 3 show the float with the attending mechanism secured to the side of the vessel on the outside thereof. The vessel A is intended to represent any style and size of craft. Considering for the time, Figs. 1, 2 and 3, the float 1 is formed spherical and is made of any desired sheet metal. Fig. 7 shows a manner of supporting it interiorly. Here a centrally located sphere 2 is provided with radially extending bracing arms 3 which have their outer ends secured to the spherical shell of the float 1. Any other means for strengthening the float may be used if desired. The float is mounted on an arm 4 by means of a universal joint. The joint is constructed by providing lugs 5 on the float, and mounting it on the yoke 6, the lugs being passed through holes in the ends of the yoke to permit the float to freely revolve, and as a securing means pins 7 are used. A socket 8 is formed on the yoke for mounting it to rotate on the end of the arm 4. This freedom of motion of the float may save it from injury if accidentally struck. It will also permit it to roll upon the water and will thus offer little resistance when the craft is moving, but at the same time will possess its entire buoyancy power.

The arm 4 has a hub 9 formed upon its other end. This hub is secured on a shaft 10 mounted in journal box 11 formed in a housing 12. The housing and mechanism is preferably of bronze or other nonrustable material. The housing is secured to the side of the vessel as by bolts or rivets 13. Secured on the shaft 10 and within the housing is a gear 14. The gear is in mesh with a worm 15 secured on a shaft 16. The shaft is mounted in a vertical journal box 17 and extends upward above the rail of the vessel. It has secured on its end the hand wheel 18. It can thus be readily seen that by turning the wheel 18 the float will be revolved in a plane parallel with the length of the vessel. Fig. 1 shows in dotted lines one float revolved to the opposite side. It may be undesirable to revolve the float too far downwardly, for in small craft there might be danger of their capsizing. I therefore provide stops 19 to arrest the motion downwardly.

Fig. 4 is a similar construction as that already described, but the mechanism is placed on the inside of the craft. It is here necessary to extend the shaft 10 through the side of the vessel in order to secure the arm 4 thereon. This construction gives a better chance to man the wheel 18. More of its periphery is within reach and thus where occasion requires more than one man may assist in turning it. The mechanism is also more protected from accidental shocks and from the water.

Figs. 5 and 6 show a different construction. Here the float B is capable of being operated to both swing in a vertical plane as in the construction already described and also to swing in a horizontal plane to and from the vessel. A combination of these motions permits placing the float in a greater variety of positions and throwing it away from the sides of the vessel to make it more effective. The following mechanism is employed for obtaining these results:—The float B is fastened rigidly to a spider 20 as by rivets 21. The spider has a socket 22 formed on it for receiving the end of the arm 23 to permit it to turn thereon. Any other manner of securing the float would do equally as well, for instance, the universal joint already described may be used if desired. On the end of arm 23 is formed a hub 24. This is secured upon a shaft 25 mounted in a journal box 26 formed in a housing 27. Upon the shaft and within the housing is secured a gear 28. This gear is in mesh with a worm 29 secured within the housing upon a vertical shaft 30. This shaft has its ends extending through the housing and on the upper end is secured the hand wheel 31. Thus far the mechanism is similar to that previously described and by turning the hand wheel the float will revolve in similar manner. To obtain the second motion of the float, the housing instead of being rigidly secured to the vessel is mounted to turn upon a vertical axis. To accomplish this a bracket 32 is rigidly secured to the side of the vessel A as by bolts 33. The bracket has projecting therefrom the two extensions 34—34, within which snugly sets the housing 12. The shaft 30 is mounted to revolve through holes formed in the extensions 34 and is relied upon to retain the housing in place and permit it to be revolved. The hand wheel 31 is conveniently above the railing of the vessel to facilitate an easy operation thereof, as in the construction previously described. To make it feasible to turn the housing 27 a series of gear teeth 35 is formed on the outside of the housing. These teeth are in mesh with a horizontal worm 36 secured upon one end of a shaft 37. The shaft is journaled in a sleeve 38 formed in the bracket 32. The sleeve and shaft extend through the side of the vessel, and a hand wheel 39 is mounted on the end of the shaft. It will clearly be seen that by turning the wheel 39 the float will be turned in a horizontal plane as shown in broken lines in Fig. 5. And by turning the wheel 31 the float will be turned in a vertical plane.

Fig. 8 is similar in construction to Fig. 4 with the exception that a differently shaped float D is shown. This float does not consume the space that a spherical float does. Any shaped float may be used however that is desired.

A craft may be required with any number of my floats and of any desired size. When emergency requires it is intended that each float will be manned by the requisite number of hands. The men will get their orders from a single central source as from the officer on the bridge. For this purpose each float will be specifically designated as by a number, letter or otherwise. In this way each float may be separately manipulated, to raise or lower it or swing it out or draw it in as the occasion requires. For instance, if the vessel should spring a leak near the bow on the starboard side and below the water line, the men managing the floats near that point would receive orders to lower the floats and thus raise that side, while the men at the other floats would receive orders to raise their floats so that the vessel could take the necessary tilt to bring the leak above water. When a damaged part has been thus raised the craft may put into port or the damaged part being above water and easily accessible may be repaired at sea. My invention enables a craft on fire to be scuttled and yet to keep afloat. In times of storm the floats may all be set in uniform positions and the craft thus helped to weather the storm. The floats are comparatively light, being water tight and only filled with air. When not in use they may be raised above the water level.

Having thus described my invention I claim—

1. In combination with a vessel, floats, each comprising a water-tight shell, an arm secured at one end to the shell to permit the shell to turn thereon, a housing secured to the side of the vessel, a shaft mounted in said housing for receiving the other end of the arm, a gear mounted on said shaft within the housing, a worm in mesh with said gear, a second shaft mounted in said housing for receiving the worm, and a hand wheel mounted on the said second shaft to operate the worm and gear to swing the shell to desired position relative to the vessel.

2. In combination with a vessel, floats, each comprising a water-tight shell, an arm secured at one end to the shell, a universal joint securing the said arm to the shell, a hub formed on the other end, a shaft upon which the hub is mounted, a housing into which the shaft is journaled, a gear mounted on said shaft within the housing, a worm in mesh with said gear, a second shaft journaled in the housing on which the worm is mounted, the said shaft extending through the housing at either end, a bracket secured to the side of the vessel, extensions formed on the bracket between which snugly fits the said housing and in which is mounted the said second shaft, a hand wheel secured to the upper end of said shaft to operate the worm and gear to swing the shell, a third shaft, a journal formed in the bracket for mounting the said third shaft therein, a second worm secured on said shaft, gear teeth formed on the housing in mesh with the said second worm, and a hand wheel mounted on the upper end of the said third shaft to operate the respective worm or gear teeth to turn the housing to swing the shell to and from the vessel.

PAOLO MAGGIO.

Witnesses:
 FRANCIS L. PISANI,
 SAVERIO CORREALE.

Copies of this patent may be obtained for five cents each, by addressing the "Commissioner of Patents, Washington, D. C."